July 22, 1930.   A. D. PENTZ   1,771,057
BRAKE SYSTEM FOR AUTOMOBILES
Filed March 14, 1925   2 Sheets-Sheet 1
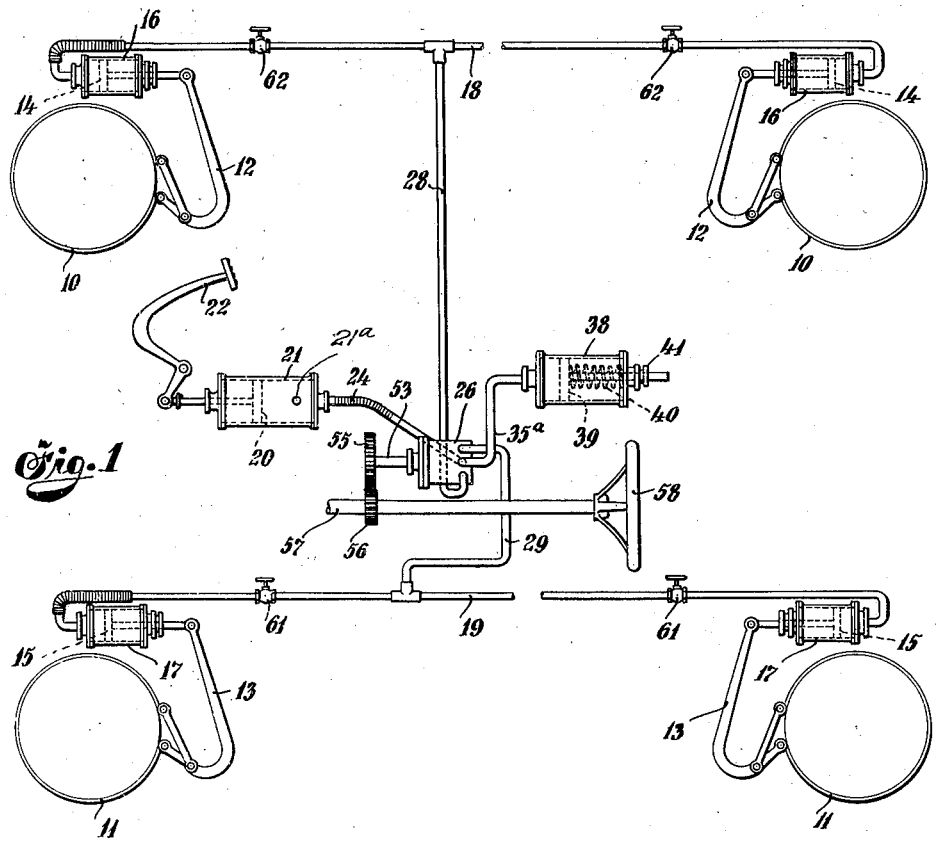
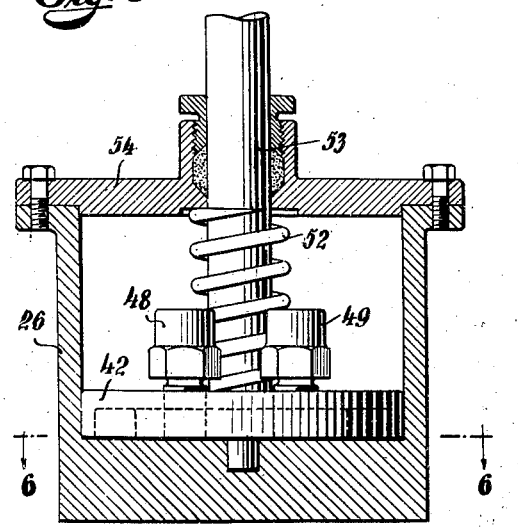
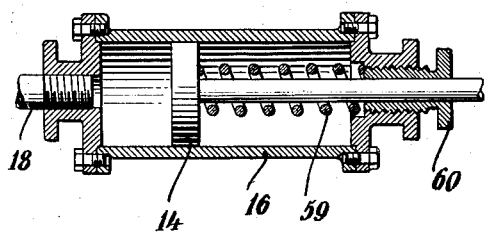
INVENTOR
Albert D. Pentz
BY
Cooper, Kerr & Dunham
ATTORNEYS

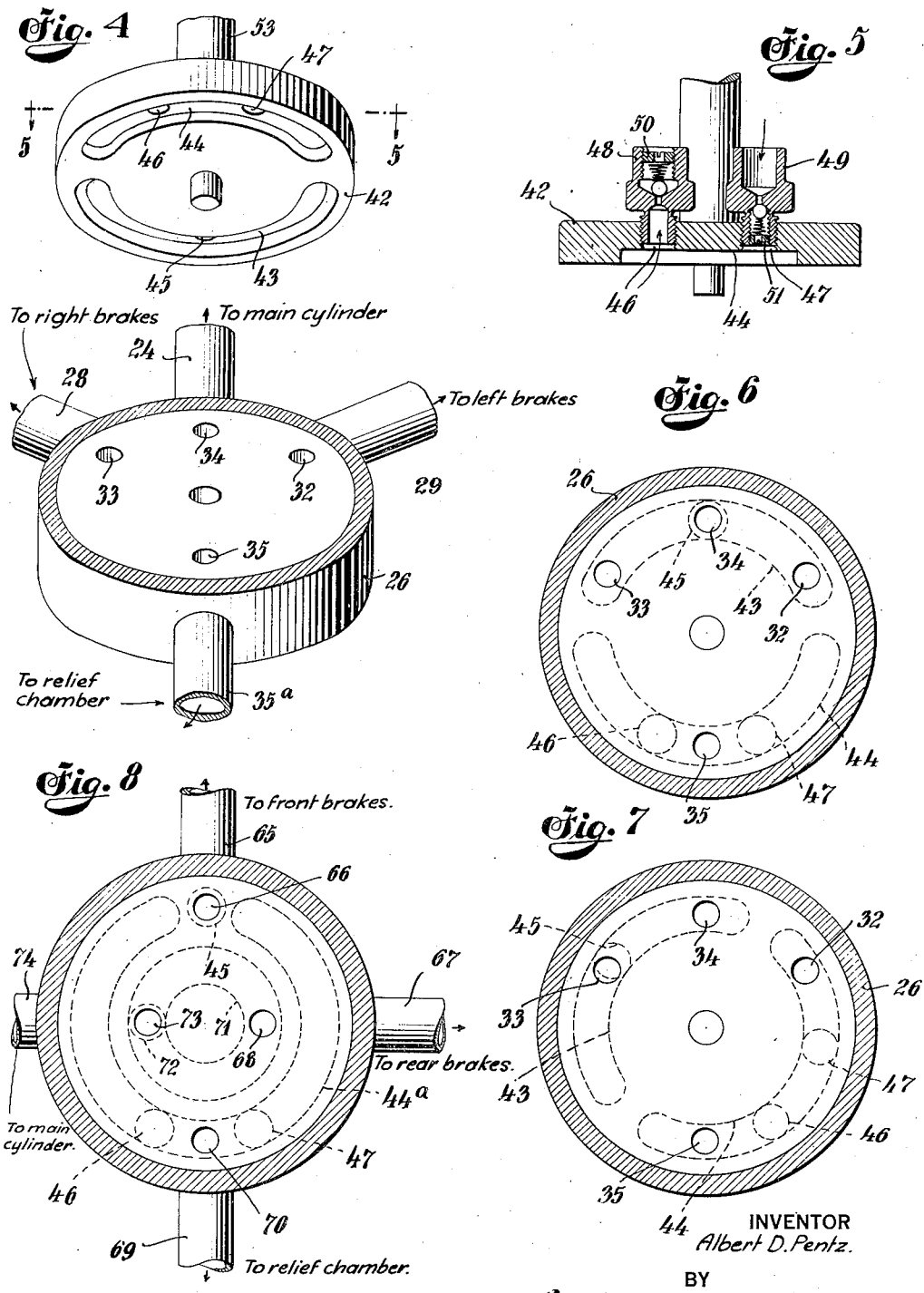

Patented July 22, 1930

1,771,057

UNITED STATES PATENT OFFICE

ALBERT D. PENTZ, OF NEW BRIGHTON, NEW YORK, ASSIGNOR TO PENTZ MOTOR BRAKE CORPORATION, OF NEW BRIGHTON, NEW YORK, A CORPORATION OF NEW YORK

BRAKE SYSTEM FOR AUTOMOBILES

Application filed March 14, 1925. Serial No. 15,451.

This invention relates to brakes for automobiles, and its chief object is to provide a system which shall possess the advantages of brakes on all four wheels, as regards slowing up and stopping the car, and in addition greater ease, certainty and safety in steering than with other four-wheel brakes now in use. To this and other ends the invention consists in the novel features hereinafter described.

In carrying out the invention in the preferred manner I provide brake mechanism for each of the four wheels, with actuating or controlling means common to all, as for example the conventional pedal suitably connected with the several brakes. It will be seen, however, after reading the subjoined description, that the feature of relieving the braking pressure (wholly or partially), when the car is making a turn, can be employed with any desired brake or combination of brakes, in front or in rear. Preferably the brake mechanisms are actuated by fluid pressure applied by depression of the pedal, which actuates a piston in a cylinder from which the pressure is distributed to auxiliary or brake cylinders connected with the main cylinder by suitable piping. In the piping is a valve by which the fluid pressure to any one or more of the auxiliary cylinders can be regulated, as for example by connection with any suitable part of the steering mechanism of the car, to produce various effects. For example, the arrangement may be such that when the front wheels (or, in general, the wheels which are pivotally mounted for steering) are turned, depression of the brake pedal will apply the brakes only on the "inside" wheel or wheels, that is, the wheel or wheels on the side toward which the turn is being made. The "outside" wheels are thus left free and can travel in harmony with the movement of the car in making the turn, and with the usual differential mechanism employed in conjunction with the rear wheels. At the same time the drag produced by braking the inside wheels causes that side of the car to move forward more slowly. The result is that the car glides easily in the desired direction. Or the construction or adjustment may be such that when the car is making a turn the outside brakes will get a certain amount of pressure but less, in any desired degree, than the pressure transmitted to the inside brakes. Or the arrangement may be such that in making a turn both front wheels (or, in general, any wheel or wheels) will get less braking pressure than the other wheels, or no pressure at all.

Simple embodiments of the invention, having the capabilities outlined above, are illustrated, somewhat diagrammatically, in the accompanying drawings, in which Fig. 1 is a diagrammatic plan view, showing the four brake-bands, which may be of any suitable type, as for example external contracting, as indicated. For the sake of clearness and simplicity of illustration the wheels, body, motor, etc., of the car are omitted, as are also the usual springs for releasing the individual brakes when the actuating pressure is relieved by allowing the brake pedal to rise.

Fig. 2 is a detail longitudinal section of one of the auxiliary brake cylinders, in the present instance the cylinder for one of the right rear wheels, showing the brake-releasing spring.

Fig. 3 is a longitudinal section of the controlling valve chamber, with the valve disk in elevation.

Fig. 4 is a perspective view of the valve disk and bottom of the valve chamber, slightly separated to show the ports in the latter and the ports and passages in the former.

Fig. 5 is a cross section of the valve disk, about on line 5—5 of Fig. 4, showing the check valves by which the pressure on selected brakes (the outside brakes, for example) is regulated.

Fig. 6 is a sectional plan view, on line 6—6 of Fig. 3, showing the relation of the passages in the valve disk to the ports in the valve chamber when the front wheels are pointed straight ahead.

Fig. 7 is a view similar to Fig. 6 but showing the relation of the same ports and passages when the front wheels are "cut" to make a turn, for example to the right.

Fig. 8 is a sectional plan view similar to

Fig. 6 but showing an arrangement of valve ports and passages for relieving the brakes on both front wheels when a turn is made.

The four brake bands 10, 11, Fig. 1, are actuated, to bring them into braking contact with the brake drums, not shown, by means of levers 12, 13, which are connected to the pistons 14, 15, in the fluid pressure cylinders 16, 17. The cylinders 16, on the right-hand side, are connected together by a distributing pipe 18, so that pressure in the pipe will be transmitted simultaneously to both. Similarly, for the same purpose, cylinders 17 on the other side are connected by distributing pipe 19. The four brake mechanisms are thus connected in lateral pairs, that is, a pair on each side of the car.

The piston 20, in the main brake cylinder 21, is connected with the brake pedal 22 so that when the latter is depressed the fluid below the piston will be driven through outlet pipe 24 and valve 26 (described hereinafter), to one or the other or both sets of brakes through one or the other or both of connecting pipes 28, 29. Any suitable provision may be made to permit free rocking movement of the brake pedal without straining the brake cylinder and piston rod as the latter moves in or out, as for example by pivoting the cylinder on trunnions 21ª and making a part of pipe 24 flexible, as indicated.

The valve 26 comprises a cup-shaped chamber, in the bottom of which are four ports, 32, 33, 34, 35, communicating with pipes 29, 28, 24, and 35ª, respectively. The last mentioned pipe leads to a relief chamber 38, which may be in the form of a cylinder containing a reciprocating piston 39 urged in one direction (against the presssure of fluid entering from pipe 35ª) by a spring 40 the compression (or, in general, the tension) of which may be regulated by adjusting the screw collar 41 in the same manner as the brake cylinder springs hereinafter described.

The movable member of the particular valve illustrated is in the form of a rotatable disk 42 having in its underside two arc-shaped grooves or passages 43, 44, concentric with the four ports 32, 33, 34, 35, the former passage being long enough to span ports 32—33 and extend slightly beyond on each side, and the latter passage extending nearly to each end of the other, as indicated in the drawing. Passage 43 also has a port 45, opening into the valve chamber above the valve disk, and passage 44 has two ports, 46, 47, equipped with ball check-valves 48, 49, the first opening outwardly, that is, toward the interior of the valve chamber, and the second opening toward the passage. The springs which press the balls on their seats may be regulated as to tension by the screw plugs 50, 51, as will be readily understood.

A spring 52 serves to hold the valve disk 42 in sealing contact with the bottom of the valve chamber when there is no fluid pressure in the chamber and aids in attaining such contact at other times.

The valve disk 42 is mounted on the inner end of a stem 53, extending up through the cover 54 and carrying at its outer end an actuating gear 55 meshing with a pinion 56 on the steering shaft 57 which can be turned by the steering wheel 58.

A brake releasing spring, as 59, Fig. 2, may be provided at each auxiliary cylinder to retract the brake piston when the pressure of the operator's foot on the brake pedal is relieved. The retraction of the brake pistons also returns the pressure-fluid to the main cylinder and thereby raises the pedal. As shown, the tension of the releasing spring can be regulated by means of the nut 60, as will be readily understood. By this adjustment the braking pressure can be equalized on all four wheels, or can be divided between front and rear in any desired ratio. For example, if it is desired to have the rear brakes take hold first and have greater braking effect than the front brakes, the rear releasing springs can be slacked off or the front springs tightened up, or both.

If desired valves may be provided in the pipes 18, 19, as indicated at 61, 62, by which either the front brakes or the rear brakes may be cut out at will. Thus if any brake mechanism is accidently disabled the corresponding brake on the opposite side can be cut out by closing its valve.

The operation of the system will now be described.

A. Assuming first that the tension of spring 40 in the relief chamber 38, Fig. 1, tending to retract the piston 39, is less or no greater than the combined tension of the brake cylinder springs at the two wheels which are to be released when a turn is made; that adjusting plug 51 in check valve 49 is set up so that the valve cannot open, and that the front wheels are pointed straight ahead so that the passages 43, 44 are positioned symmetrically with respect to the valve chamber ports as in Fig. 6.

B. If the driver now depresses the brake pedal, the piston 20 will be advanced, fluid will be forced thereby through pipe 24, port 34, passage 43 (in the valve disk) and by way of ports 33, 32 through pipes 28, 29, 18, 19, to the four brake cylinders, and the brakes will be applied on all four wheels, as will be readily understood. At the same time fluid (under the same pressure) enters the valve chamber through port 45 in the valve disk and presses the latter firmly on its seat, but cannot escape through check valve 49 since, as assumed in paragraph A, the ball therein is locked on its seat.

C. The conditions being as described in paragraphs A and B, suppose the driver "cuts" or turns the front wheels to make, for example, a right turn. The valve disk is thereby rotated counterclockwise, carrying passage 43 off of port 32 and carrying passage 44 over port 32, as in Fig. 7 for example. Port 32 (supplying the brake cylinders on the left side) is now cut out of the pressure system but is included in the "relief" system or "circuit", whereupon the brake cylinder springs on the left side retract the brake pistons and force the fluid back through pipes 19 and 29, port 32, passage 44, port 35, and pipe 35ª, into the relief chamber 38. In other words the left (or outside) brakes are entirely released. Resistance is thus offered to the motion of the car on the right hand side, but none on the left; with the result that the car swings freely to the right, practically "steers itself", in fact. If, the turn being completed, the driver desires to "straighten out" without braking he simply lifts his foot, and turns the wheel to the left as usual, thereby returning the valve disk passages to the position shown in Fig. 6, whereupon the brake pistons on the right are retracted by their springs and the fluid is forced back to the main cylinder 21. At the same time the piston in the relief chamber is advanced by spring 40 (the pressure on top of check-valve 48 having been relieved by the driver lifting his foot from the brake pedal), thereby forcing the fluid back through pipe 35ª, port 35, passage 44, and check valve 48 into the valve chamber, whence it passes through port 45 (in the valve disk), passage 43, port 34 and pipe 24 back to the main cylinder. If he desires to continue braking (while or after straightening out) he keeps pressing down on the pedal while turning the wheel to the left. Then as soon as the aperture or port 32 is covered by passage 43 the braking pressure is transmitted to the left hand cylinders and the brakes are applied on that side also. Later, when he lets the brake pedal rise, fluid from the four brake cylinders and from the relief chamber flows back to the main cylinder in the manner already described. Of course the brakes which are in operation can be instantly released at any time by lifting the foot, regardless of the position of the valve disk and steering wheel.

D. Assume the conditions of paragraph A except that the spring in check valve 49 is adjusted to permit the valve to open at a pressure $m$ on the cross sectional area of its seat, which for convenience we shall take as the unit area. Assume also that the initial tension of the spring 40 in the relief chamber 38 is sufficient to produce a back pressure on the ball of $n$, the entire system being of course full of fluid. Evidently (the system being full of fluid) the total resistance to the opening of the check valve is $m+n$, but the pressure on the relief chamber piston is only $n$. Hence the pressure on the four brake cylinders (when the front wheels are straight) can always be greater than the pressure in the relief chamber by any amount up to $m$ when check valve 49 is closed. The driver now depresses the brake pedal, producing in the valve chamber and therefore in each brake cylinder a pressure $p=m+n$, and turns the front wheels to the right, thereby rotating the valve disk counterclockwise to the position shown in Fig. 7, for example. Since (obviously) $p>n$, fluid flows from the left brake cylinders into the relief chamber until the pressure in the left cylinders, and the pressure in the relief chamber, are equalized, the former decreasing by an amount $h$ and the latter increasing by $i$. The increase of relief-chamber pressure of course increases the back pressure on the check valve 49 by the amount $i$. Consequently the braking effect on the left wheels is diminished without the right hand brakes being affected either way. In other words, in making a turn with all four brakes applied the brakes on the outside are eased off partially but not entirely, the pressure on the inside brakes being $m+n$, and that on the outside being $(m+n)-h=n+i$. At the same time the upward pressure of the check valve ball is $m+n+i$. The driver now depresses the brake pedal farther, thereby increasing the pressure in the valve chamber and simultaneously in the inside brake cylinders. Until the latter pressure reaches $m+n+i$ the outside brakes are not affected, but when the latter value is attained the check valve 49 opens and fluid flows both to the relief chamber and to the outside cylinders. Thereafter the outside and inside brake pressures increase by equal increments but the former is always less than the latter by an amount depending upon the design of the apparatus.

E. Assuming (as in paragraph D) that the check valve and relief chamber springs are set to give a back pressure of $m+n$ on the ball, and that without turning the front wheels the driver produces in the valve chamber a pressure greater than $m+n$: The check valve then opens and fluid flows into the relief chamber until the pressure in the relief chamber and the pressure in the valve chamber (and therefore in the brake cylinders) are equalized. Thereafter these two pressures equalize themselves upon increase of the pressure in the valve chamber by increments of pressure equal to the counter-force $(m)$ exerted by the valve spring 48. Thus the pressure in the valve chamber is always equal to that in the relief chamber or greater by some fraction of the force $m$. Now when the valve is turned (as in Fig. 7, for example) the same effect is produced as is described in paragraph D: Fluid flows from the outside brake cylinders into the relief chamber until the pressures in the former and latter are equalized, thus effecting a partial relief of the brake pressure on the outside wheels.

F. It will also be seen that when the driver releases the brake pedal, fluid under pressure in any brake cylinder which is in communication with valve passage 43 is forced back through port 34 and pipe 24 into the main cylinder 21. At the same time any fluid under pressure in the relief chamber, and any fluid under pressure in a brake cylinder which is in communication with valve passage 44, is forced back through check valve 48 into the valve chamber and thence through ports 45, 34, and pipe 24, to the main cylinder.

It will also be understood that the difference between the brake pressure on the outside wheels and the brake pressure in the inside wheels when the front wheels are turned depends upon the initial tensions of the various springs involved. The stiffness of the springs has no effect upon the difference mentioned, since stiffness affects only the rate of flexure (compression or elongation in the case of a helical spring) as the impressed force varies. As the front wheels are turned to right and left with the brakes applied, as may be necessary in descending a long winding grade, more and more of the fluid may find its way from the main cylinder into the relief chamber. I therefore prefer to use stiff springs, small brake cylinders, and large main cylinder and relief chamber, so that it will be virtually impossible, in the proper employment of the brakes, to empty the main cylinder or decrease the quantity of fluid therein to a point where the main piston can have no further movement in the pressure-producing direction.

The point at which, in the turning of the front wheels, the port 32 or 33 is put in communication with the relief chamber, depends upon the length of the slots 43 and 44 and the ratio of the gearing between the valve and the wheels. Thus if the slot or passage 43 is just long enough to cover both ports when the front wheels are straight, the ends of slot 44 are close to slot 43, and the gear ratio is one to one or higher, one port or the other will be passed by very slight movement of the wheels, and the longer the passage 43 or the lower the ratio the later will the port be passed. Preferably the construction is such (as by the use of a suitable gear ratio) that the front wheels can be swung far enough to make a slight turn, say to permit easy passing of an approaching vehicle, before the outer brakes are cut out or eased up.

The control valve illustrated in Fig. 8 is designed to cause the braking pressure at both front wheels to be relieved when a turn is made. In this case the pipe 65 delivers pressure from port 66 to the front brake cylinders (which are both connected to the said pipe) and pipe 67 is connected from port 68 to both rear cylinders for delivery of pressure thereto. Pipe 69 connects port 70 with the relief chamber. Passage 43, Fig. 4, is in Fig. 8 reduced in length or omitted entirely, leaving only port 45, while passage 44 is correspondingly lengthened, for example as indicated at 44ª, Fig. 8. In addition a passage 71 is provided, with a port 72 through the valve disk, to transmit fluid from the valve chamber (above the valve disk) to the port 68. It will be observed that passage 71 is endless, so that the pressure in the valve chamber is never cut off from the rear brakes. Ports 46 and 47 are provided in the valve disk for the check valves 48, 49, as in Fig. 5. Port 73 is connected by pipe 74 to the main cylinder. The effect of turning the valve disk in Fig. 8 is precisely the same as the effect described in connection with the other figures, except that, as will be readily understood, the pressure-relieving function is effective on the two front wheels instead of upon two wheels at one side of the car.

It is to be understood that the invention is not limited to the constructions herein specifically illustrated and described but can be embodied in other forms without departure from its spirit. Where in the appended claims I refer to brakes in "lateral" pairs I mean that the brakes on one side of the vehicle constitute one lateral pair and those on the other side another lateral pair, without, however, excluding a system in which only one brake is provided on each side.

I claim:

1. In an automobile brake system, in combination, brake mechanisms for four wheels, fluid-pressure actuating means connected with the brake mechanism to actuate the same in lateral pairs, foot-actuated means for producing fluid-pressure, car-steering mechanism, and a valve connected with the steering mechanism for actuation thereby and with the said actuating means to permit operation of the pairs of brake mechanisms with maximum braking pressure singly or simultaneously according to the direction of travel of the car.

2. In an automobile brake system, in combination, fluid-pressure actuated brake mechanisms for four wheels, connected together in lateral pairs, one pair on each side of the car valve-controlled mechanism for causing the actuating fluid pressure to be applied to both pairs of brake mechanisms simultaneously when the car is traveling in a straight course and for relieving the fluid-pressure on both mechanisms of the outside pair when the car is making a turn and means to receive the fluid from the relieved pair of brakes and return the same to the system.

3. In an automobile brake system, in combination, fluid-pressure actuated brake mechanisms for four wheels; foot-actuated means for producing and applying fluid pressure to the brake mechanisms, including a pair of pipes for distributing the fluid pressure to the brake mechanisms in lateral pairs; car-steering mechanism; and valve mechanism connected with said pipes and actuated by the steering mechanism to transmit fluid through one of said pipes and permit return of fluid through the other according to the direction in which the car is steered.

4. In an automobile brake system, in combination, fluid-pressure actuated brake mechanisms for four wheels; car-steering mechanism; foot-actuated means for producing fluid pressure; piping for connecting the brake mechanisms in lateral pairs to the pressure producing means; a valve between said means and said piping provided with a pair of brake-ports for putting the piping in direct communication with said means for producing fluid pressure, and provided with a movable member adapted to put either or both of said ports in such direct communication, said valve having means for putting either port in indirect communication with said pressure producing means for supplying less pressure to one pair of brakes than to the other; and actuating means connecting the movable member of the valve with the car steering mechanism for actuation thereby.

5. In an automobile brake system, the combination with four-wheel fluid-pressure actuated brake mechanisms, foot-actuated means for producing fluid pressure, and fluid-pressure piping connecting the brake mechanisms for actuation in lateral pairs, of a distributing valve chamber connected with said means and said piping and having a pair of brake-ports for direct delivery of fluid pressure to said pairs of brake mechanisms singly or to both simultaneously, a rotatable valve member in said chamber having a passage connected with said pressure producing means, adapted to embrace either or both said ports according to its position relative thereto, and having a passage adapted to embrace one of said ports when the other is not embraced by the first-mentioned passage, means carried by the rotatable member for supplying through the second-mentioned passage and whichever port embraced thereby less fluid pressure than is supplied to the port embraced by the first-mentioned passage, car-steering mechanism including a manually actuated steering shaft, and gearing connecting the rotatable valve member with the steering shaft for actuation thereby.

6. In an automobile brake system, the combination with four-wheel fluid-pressure actuated brake mechanisms connected for actuation in lateral pairs, and pedal-actuated means for producing fluid pressure, of a valve to distribute the fluid pressure directly to both pairs of brake mechanisms singly or simultaneously, comprising a chamber having a pair of fluid-pressure brake ports connected with the lateral pairs of brake mechanisms, a slotted valve member rotatable in the valve chamber adapted to connect either or both ports with the fluid pressure producing means, car-steering mechanism, and gearing connecting the steering mechanism with the rotatable valve member to actuate the latter according to the direction in which the car is turned.

7. In an automobile brake system, in combination, fluid-pressure actuated brakes connected in pairs; a source of fluid pressure; piping for connecting the pairs of brakes with the source of fluid pressure; a controlling valve in said piping, comprising a valve chamber having a pair of ports for supply of fluid pressure to said pairs of brakes individually and having a relief port, a movable member in said valve chamber, having a groove cooperating with said pair of ports to embrace either or both and thereby put one or both in communication with said source of fluid pressure according to the position of the movable member, and having a groove embracing the relief port and adapted to embrace also one or the other of said pair of ports according to the position of the movable member, a relief chamber connected with said relief port to receive fluid therethrough when the movable member of the controlling valve is in a position in which its second-mentioned groove embraces the relief port and either of said pair of ports; car steering mechanism; and means connecting the movable member of the controlling valve with the car-steering mechanism for actuation thereby.

8. In an automobile brake system, in combination, fluid-pressure actuated brakes connected in pairs; means for producing and relieving fluid pressure at will; piping for connecting the pairs of brakes with said fluid pressure producing and relieving means; a controlling valve in said piping, comprising a valve chamber having a pair of ports for supply of fluid pressure to said pairs of brakes individually and having a relief port, a movable member in said valve chamber, having a groove cooperating with said pair of ports to embrace either or both and thereby put one or both in communication with said source of fluid pressure according to the position of the movable member, and having a groove embracing the relief port and adapted to embrace also one or the other of said pair of ports according to the position of the movable member; a relief chamber connected with said relief port to receive fluid therethrough when the movable member of the controlling valve is in position in which its second-mentioned groove embraces the relief port and either of said pairs of ports; means permitting back-flow of fluid from the relief chamber when the rest of the system is relieved; car-steering mechanism; and means connecting the movable member of the controlling valve with the car-steering mechanism for actuation thereby.

9. In an automobile brake system, in combination, fluid-pressure actuated brakes connected in pairs; means for producing and relieving fluid pressure at will; car-steering mechanism; piping for connecting the pairs of brakes with said means; a controlling valve in said piping, comprising a valve chamber connected with the pressure-producing means to receive fluid from and deliver fluid to the same, and having a pair of ports for supply of fluid pressure to said pairs of brakes individually and having a relief port, a movable member in said valve chamber, having a groove cooperating with said pair of ports to embrace either or both and thereby put one or both in communication with the interior of the valve chamber, and having a groove embracing the relief port and adapted to embrace one or the other of said pair of ports according to the position of the movable member; a relief chamber connected with said relief port to receive fluid therethrough; a check-valve carried by the movable valve member to permit flow of fluid from the relief chamber into the valve chamber when the pressure in the former exceeds the pressure in the latter, a check-valve carried by the movable valve member to permit flow of fluid from the valve chamber to the relief chamber when the pressure in the former reaches a predetermined value; and means connecting the movable member of the controlling valve with the car-steering mechanism for actuation thereby.

10. In an automobile brake system, in combination, fluid-pressure actuated braking means on each side of the car, steering mechanism for the car, brake-controlling means actuated by the steering mechanism to relieve the braking pressure of one side of the car when the steering mechanism is actuated to turn the car toward the other side, and automatic means for limiting to a predetermined maximum the difference of braking pressure between the two sides of the car when the braking pressure on one side is relieved.

11. In an automatic brake system, in combination, fluid-pressure actuated brake mechanisms one on each side of the car, means for supplying variable fluid-pressure for actuating said mechanisms, means for relieving the braking pressure on one side of the car when the car is making a turn, and automatic means for limiting to a predetermined maximum the difference of braking pressures on the two sides of the car.

12. In an automobile brake system, in combination, fluid-pressure actuated brake mechanisms one for each side of the car, steering mechanism, means controlled by the steering mechanism to relieve the braking pressure on the outer side only of the car in making a turn, and automatic means controlled by the braking pressure on the inner side to limit to a predetermined maximum the difference between the braking pressures on the two sides of the car.

13. In an automobile brake system, in combination, fluid-pressure actuated brake mechanisms one on each side of the car, means for supplying variable fluid-pressure for actuating said mechanisms, means for relieving the braking pressure on one side of the car when the car is making a turn, and automatic means for limiting to a predetermined maximum the difference of braking pressures on the two sides of the car, said automatic means being associated with the pressure-relieving means and comprising a relief valve and a spring yieldingly holding said valve closed.

14. In an automobile brake system, in combination, fluid-pressure actuated brake mechanisms one on each side of the car, means for supplying variable fluid-pressure for actuating said mechanisms, means for relieving the braking pressure on one side of the car when the car is making a turn, and automatic means for limiting to a predetermined maximum the difference of braking pressures on the two sides of the car, said automatic means comprising a relief valve, a spring yieldingly holding said valve closed, and means for varying the tension of the spring to vary the aforesaid maximum.

15. In an automobile brake system, in combination, four-wheel brake mechanisms, means operable at will for actuating all four brake mechanisms simultaneously, and automatic means acting when the car is making a turn to relieve the braking pressure of both brake mechanisms of the pair on the outside of the turn.

16. In an automatic brake system, in combination, four-wheel brake mechanisms, foot-actuated means for supplying liquid under pressure to all four of said mechanisms to actuate the same simultaneously, steering mechanisms for the car, and brake-controlling means actuated by the steering mechanism when the car is making a turn to relieve the braking pressure of both brakes on the outside of the turn.

17. In an automobile brake system, in combination, four-wheel brake mechanisms, foot-actuated means for supplying liquid under pressure to all four of said mechanisms to actuate the same simultaneously, steering mechanism for the car, brake-controlling means actuated by the steering mechanism when the car is making a turn to permit escape of liquid from both brake mechanisms on the outside of the turn, and means for receiving and returning to the system the liquid so escaping.

18. In an automobile brake system, in combination, four-wheel hydraulic brake mechanisms connected in lateral pairs, one pair on either side of the car, foot-actuated means for supplying liquid under pressure to all four of said brake mechanisms simultaneously, steering mechanism for the car, brake-controlling valve means connected with the steering mechanism for actuation thereby and associated with said pairs of brakes to permit escape of liquid from the brake mechanisms of the outside pair when the car is making a turn, and means for receiving and returning to the system the liquid so escaping.

19. In an automobile brake system, in combination, four-wheel hydraulic brake mechanisms connected in lateral pairs, one pair on each side of the car, foot-actuated means for supplying liquid under pressure to both said pairs of brake mechanisms simultaneously, said means including pipes connecting the foot-actuated means and the pairs of brake mechanisms, steering mechanism for the car, a controlling valve connected with the steering mechanism for actuation thereby and connected with said pipes and said foot-actuated means to permit escape of liquid from the brake mechanisms on the outside when the car is making a turn, and means for receiving and returning to the system the liquid so escaping.

20. In an automobile brake system, in combination, four-wheel hydraulic brake mechanisms, pipes connecting said brakes in lateral pairs, foot-actuated means for supplying liquid under pressure, pipes connecting said foot-actuated means with the first mentioned pipes, steering mechanism for the car, a controlling valve connected with the steering mechanism for actuation thereby and with the second mentioned pipes to permit escape of pressure liquid from the outside pair of brake mechanisms when the car is making a turn, and means to receive and return to the system the liquid so escaping.

In testimony whereof I hereto affix my signature.

ALBERT D. PENTZ.